(12) United States Patent
Hsu et al.

(10) Patent No.: US 8,013,039 B2
(45) Date of Patent: Sep. 6, 2011

(54) ENCAPSULANT COMPOSITION FOR A LIGHT-EMITTING DIODE

(75) Inventors: Chia-Wen Hsu, Taipei (TW); Hsun-Tien Li, Hsinchu (TW); Kai-Chi Chen, Nantou County (TW)

(73) Assignee: Industrial Technology Research Institute, Hsinchu (TW)

( * ) Notice: Subject to any disclaimer, the term of this patent is extended or adjusted under 35 U.S.C. 154(b) by 387 days.

(21) Appl. No.: 12/163,167

(22) Filed: Jun. 27, 2008

(65) Prior Publication Data

US 2009/0093570 A1   Apr. 9, 2009

(30) Foreign Application Priority Data

Oct. 9, 2007   (TW) .............................. 96137798 A

(51) Int. Cl.
*H01B 3/40* (2006.01)
(52) U.S. Cl. ........ 523/451; 523/400; 525/343; 525/350; 525/481; 528/374; 528/375; 560/195
(58) Field of Classification Search .................. 523/400, 523/451; 525/343, 350, 481, 523; 528/374, 528/375; 560/195
See application file for complete search history.

(56) References Cited

U.S. PATENT DOCUMENTS

| 3,369,040 | A | * | 2/1968 | De Acetis | 560/87 |
| 3,873,502 | A | * | 3/1975 | Hickner et al. | 528/109 |
| 4,376,174 | A | * | 3/1983 | Itoh et al. | 523/456 |
| 5,130,361 | A | * | 7/1992 | Hegedus et al. | 524/204 |
| 5,202,407 | A | * | 4/1993 | Pham et al. | 528/89 |
| 5,430,112 | A | * | 7/1995 | Sakata et al. | 525/526 |
| 5,739,187 | A | * | 4/1998 | Asano et al. | 523/451 |
| 6,320,020 | B1 | | 11/2001 | Takuma et al. | |
| 6,596,841 | B2 | | 7/2003 | Tanaka et al. | |
| 6,653,371 | B1 | * | 11/2003 | Burns et al. | 523/455 |
| 6,706,894 | B2 | | 3/2004 | Okubo et al. | |
| 2004/0021133 | A1 | * | 2/2004 | Nagpal et al. | 252/500 |
| 2006/0052547 | A1 | * | 3/2006 | Jethmalani et al. | 525/333.3 |

FOREIGN PATENT DOCUMENTS

| JP | 9316129 | 12/1997 |
| JP | 2006199724 | 8/2006 |
| TW | I274062 | 2/2007 |

OTHER PUBLICATIONS

Kim et al., "Synthesis and Characterization of Poly(arylene ether)s Containing Benzoxazole Pendants from Novel Aromatic Difluoride Monomer", Bull. Korean Chem Soc. 2000, vol. 21, No. 9, pp. 896-900.*
Abstract of JP01272657 A, JPO, 1989.*

* cited by examiner

*Primary Examiner* — Mark Eashoo
*Assistant Examiner* — Nichole M Buie-Hatcher
(74) *Attorney, Agent, or Firm* — Muncy, Geissler, Olds & Lowe, PLLC

(57) ABSTRACT

An encapsulant composition for a light-emitting diode is provided. One embodiment of the encapsulant composition comprises: (a) about 100 parts by weight of at least one liquid bi-functional epoxy resin containing about 40~50 weight % of aromatic ring; (b) about 55~120 parts by weight of a curing agent comprising at least one bi-functional thiol curing agent containing aromatic ring and at least one aliphatic tetra-functional thiol curing agent, wherein the curing agent contains about 10~50 weight % of aromatic ring and about 20~35 weight % of sulfur; and (c) about 0.05~0.5 parts by weight of a catalyst. The encapsulant composition having a high refractive index can be used for a solid state light emitting device to enhance light extraction efficiency.

9 Claims, No Drawings

ENCAPSULANT COMPOSITION FOR A LIGHT-EMITTING DIODE

CROSS REFERENCE TO RELATED APPLICATIONS

This Application claims priority of Taiwan Patent Application No. 96137798, filed on Oct. 9, 2007, the entirety of which is incorporated by reference herein.

1. Field of the Invention

The invention relates to an encapsulant composition and more particularly to a transparent encapsulant composition with high refractive index which can be applied for a light emitting diode.

2. Description of the Related Art

Recently, light emitting diodes (LEDs) have been applied widely, with high brightness LEDs heavily demanded. A total light extraction efficiency of an LED is determined by a diode chip, packaging style and encapsulant material. Currently, internal light extraction efficiency of an LED chip has reached more than 90%, but the total light extraction efficiency of an LED is only 30%. The low total light extraction efficiency of an LED is due to large refractive index differences between LED chips and conventional transparent encapsulants. Light emittance of an LED chip will pass through the conventional encapsulant and produce a total reflection. Light emitting from the LED chip is limited in the interior of LED package such that the total light extraction efficiency of the LED is reduced. Therefore, an LED encapsulant material with high refractive index is desired.

The conventional transparent encapsulant materials used in LEDs are epoxy resin, silicone resin or urea resin. When considering fabrication cost and electrical characteristics of LEDs, epoxy resin is the most popularly used encapsulant material. The epoxy resins used as an LED encapsulant must have high transmittances, high refractive indexes, thermal resistances, humidity resistances, insulating properties, high mechanical strengths, chemical stabilities and good process abilities.

U.S. Pat. No. 6,596,841B2 discloses a polythiol compound with a high refractive index which is used for fabricating lenses having a high refractive index. During the process of polythiol compound synthesis, chloroform is used for extraction. Note that the processes for preparing polythiol compound are complex and require a long period of time for curing. Therefore, this compound is not suitable for mass producing LEDs. U.S. Pat. No. 6,706,894B2 discloses a thiol compound with a high refractive index. The thiol compound requires a four step process and more than 200 hours for synthesizing. The thiol compound is suitable for fabricating lenses. The compounds as described, requires a long period of time for curing and the synthesized reactions thereof are difficult to control, such that the compounds are not suitable to be used as an encapsulant of LEDs.

Meanwhile, with input power of LED chips increasing, operating temperature thereof has also increased. As such, the conventional epoxy resin encapsulant with high hardness makes stress produced in the encapsulant more difficult to disperse. With encapsulant composition materials of packaged LEDs having different coefficients of expansion, reliability problems occur such as wire breaking or delamination. Thus, silicone resin with low hardness is substituted for epoxy resin in the encapsulant of high powered LEDs, since silicone resin can disperse stress produced in the package of LEDs for protecting the chip. However, the refractive index of silicone resin is lower than epoxy resin such that the total light extraction efficiency of LEDs is reduced. Additionally, adhesion and refractive index of silicone resins are normally deficient, and the mechanical properties thereof are also poor for protecting LEDs. Therefore, a multi-layered packaging structure is needed for protecting the LEDs, raising packaging costs.

PACKAGING BRIEF SUMMARY OF THE INVENTION

The invention provides an encapsulant composition for a light emitting diode. Moreover, the invention provides an encapsulant composition for LEDs to overcome the problems of current high refractive index materials which are not suitable for the encapsulant of LEDs.

The invention provides an encapsulant composition for a light emitting diode. The encapsulant composition comprises: (a) about 100 parts by weight of at least one liquid bi-functional epoxy resin containing about 40~50 weight % of aromatic ring; (b) about 55~120 parts by weight of a curing agent comprising at least one bi-functional thiol curing agent containing aromatic ring and at least one aliphatic tetra-functional thiol curing agent, wherein the curing agent contains about 10~50 weight % of aromatic ring and about 20~35 weight % of sulfur; and (c) about 0.05~0.5 parts by weight of a catalyst.

A detailed description is given in the following embodiments.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The invention provides an encapsulant composition applied for for a light emitting diode. The encapsulant composition of the invention has a hardness between high hardness (91.7 D) of the commercial epoxy resin encapsulant and low hardness (60 D) of the commercial silicone resin encapsulant, such that poor thermal stress dispersal of the commercial epoxy resin encapsulant can be overcome. At the same time, the encapsulant composition of the invention can overcome the disadvantages of the commercial silicone resin encapsulant such as softness, to protect the device and requirement for a complex packaging structure.

The invention utilizes the molecular structure design of the encapsulant composition to enhance refractive index of the encapsulant. The encapsulant can achieve high refractive indexes by high density, large molar refractivity and small molar volume of the encapsulant composition. The characteristics can be achieved by modifying the molecular structure of the encapsulant composition through chemical synthesis. For example, aromatic rings, halogen atoms except fluorine, sulfur or heavy metal atoms can be used for joining into the molecular structure of the encapsulant composition to enhance the refractive index thereof. The invention utilizes a tetra-functional thiol curing agent and a bi-functional thiol curing agent containing aromatic ring to substitute with the conventional anhydride curing agent, such that the contents of sulfur and aromatic compound in the resin encapsulant composition are increased and the refractive index of the encapsulant is enhanced from 1.53 of the conventional epoxy resin to more than 1.60.

The major components of the encapsulant composition of the invention are epoxy resin and curing agent. A transparent and colorless encapsulant with high refractive index can be formed from different ratios of epoxy resin to curing agent. The invention provides an encapsulant composition comprising about 100 parts by weight of at least one liquid bi-functional epoxy resin containing about 40~50 weight % of aromatic ring. The encapsulant composition further comprises about 55~120 parts by weight of a curing agent including at least one bi-functional thiol curing agent containing aromatic ring and at least one aliphatic tetra-functional thiol curing agent for curing the liquid bi-functional epoxy resin, wherein the curing agent contains about 10~50 weight % of aromatic ring and about 20~35 weight % of sulfur. The weight ratio of bi-functional thiol curing agent containing aromatic ring to aliphatic tetra-functional thiol curing agent can be about 1:4 to 3:1. Moreover, the encapsulant composition further comprises about 0.05~0.5 parts by weight of a catalyst.

In one aspect of the invention, an encapsulant composition comprises about 100 parts by weight of epoxy resin, about 50~125 parts by weight of a curing agent including at least one bi-functional thiol curing agent containing aromatic ring and at least one aliphatic tetra-functional thiol curing agent and about 0.03~0.6 parts by weight of a catalyst.

In one embodiment of the invention, the liquid bi-functional epoxy resin may be bisphenol A or bisphenol F epoxy resin, i.e. diglycidyl ether of bisphenol A or bisphenol F, which has an average epoxy equivalent weight of about 160~190 g/eq. The bi-functional thiol curing agent containing aromatic ring is such as 4,4'-Thiobisbenzenethiol (TBT) which has a structure as below:

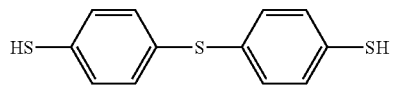

or bi-[2,2'-bis(mercaptomethyl)-1,1-biphenyl methlene sulfide] (Biphenyl dithiol) which has a structure as below:

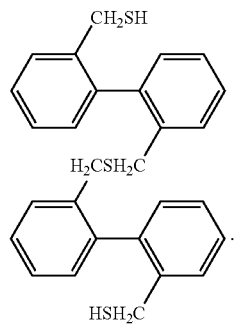

The aliphatic tetra-functional thiol curing agent is such as pentaerythritol tetrakis (3-mercaptopropionate) (PTT-3MP) which has a structure as below:

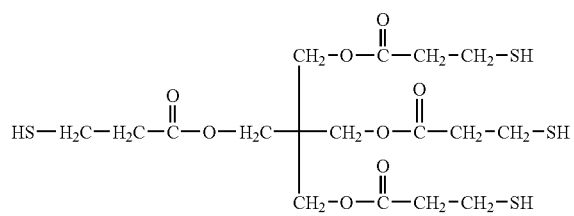

or pentaerythritol Tetramercaptoacetate (PETMA) which has a structure as below:

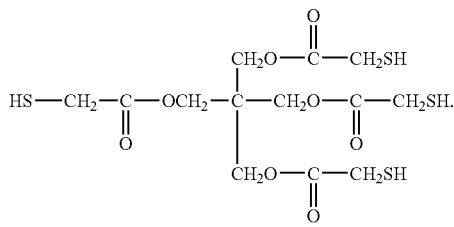

The catalyst can be a quaternary phosphonium bromide accelerator, tetra-n-butylphosphonium o,o-diethylphosphorodithioate (PX-4ET) or tetra-butyl ammonium bromide (TBAB) which can be used in epoxy resin/thiol curing agent system to obtain a colorless and transparent encapsulant for a light emitting device.

Moreover, the encapsulant composition of the invention may further comprise other additives, for example, about 0.25~1 parts by weight of an anti-oxidant. The anti-oxidant may be a hindered phenol or an organic phosphite compound such as Chinox 1076 or tris(nonylphenyl)phosphate 1178 which have structures as below:

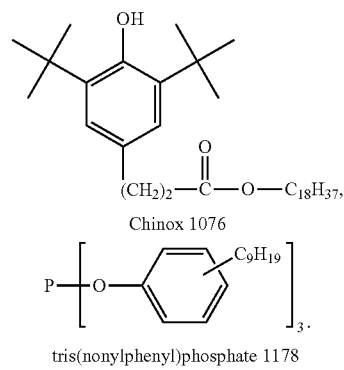

Chinox 1076 tris(nonylphenyl)phosphate 1178

The encapsulant composition of the invention can be formed from mixing the above described curing agent, catalyst, other additives and epoxy resin, deaerating the mixture by vacuum, and then curing at 80° C. for one hour and at 160° C. for two hours.

The encapsulant composition of the invention provides the following advantages:

1. The encapsulant material of the invention with high refractive index has a hardness between that of epoxy resin and silicone resin, such that it can overcome the disadvantages of insufficient thermal stress dispersion of epoxy resin and insufficient device protection of silicone resin.

2. The refractive index of the encapsulant can be increased to more than 1.60 and the total light extraction efficiency of LED device is enhanced.

3. The encapsulant of the invention with high refractive index can resist yellowing under thermal aging at 110° C. for more than 500 hours. After thermal aging, the difference of yellow index (ΔYI) is smaller than 2 and the transmittance at 400 nm reduces less than 5% when compared to the initial value.

4. The encapsulant of the invention with high refractive index can pass a soldering test under 260° C. for 90 seconds.

The encapsulant composition, the fabrication method and the related measurement results for examples and comparative examples are described in detail as below:

EXAMPLE 1

The encapsulant composition of Example 1 is shown in the table below:

| composition | amount (g) | annotation |
|---|---|---|
| EPON-828 | 100 | average equivalent weight of bi-functional epoxy resin: 190 g/eq. |
| TBT | 13.15 | molecular weight of bi-functional thiol curing agent containing aromatic ring: 250.40 g/mole |
| PTT-3MP | 51.47 | molecular weight of aliphatic tetra-functional thiol curing agent: 488.66 g/mole |
| U-cat 5003 | 0.329 | quaternary phosphonium bromide accelerator |
| Chinox 1076 | 0.25 | hindered phenol anti-oxidant |
| 1178 | 0.25 | organic phosphite anti-oxidant |

In the encapsulant composition of Example 1, the bi-functional epoxy resin is diglycidyl ether of bisphenol A (EPON-828) (product of Shell chemical. Inc.), the bi-functional thiol curing agent containing aromatic ring is 4,4'-thiobisbenzenethiol) (TBT) (product of TCI Co. Inc.), the aliphatic tetra-functional thiol curing agent is pentaerythritol tetrakis (3-mercaptopropionate) (PTT-3MP) (product of TCI Co.), the catalyst is quaternary phosphonium bromide (U-cat 5003) (product of San-apro limited. Inc.), and the anti-oxidants are a hindered phenol anti-oxidant (Chinox 1076) (product of Sigma-Aldrich Co.) and an organic phosphite anti-oxidant tris(nonylphenyl)phosphate (1178) (product of Sigma-Aldrich Co.).

The epoxy resin (EPON-828), the bi-functional thiol curing agent (TBT) and the catalyst (U-cat 5003) were mixed in a reactor, wherein the amount of U-cat 5003 is 0.2 weight % of Epon-828+TBT. Then, the mixture was stirred at 100° C. for reaction for 30 minutes to complete a reagent A. The aliphatic tetra-functional thiol curing agent (PTT-3MP), the catalyst (U-cat 5003) and the anti-oxidants (Chinox 1076 and 1178) were mixed in a reactor, wherein the amount of U-cat 5003 is 0.2 weight % of PTT-3MP. Then, the mixture was stirred at room temperature until the catalyst and the anti-oxidants were dissolved to complete a reagent B.

The reagent A and the reagent B were stirred and well-mixed at 60° C. for 30 minutes to complete an encapsulant material, then the encapsulant material was deaerated in vacuum for 20 minutes. Next, the encapsulant material was poured into a mold, heated in an oven at 80° C. for one hour and then at 160° C. for two hours to be completely cured.

Then, the encapsulant material of Example 1 was stripped from the mold to obtain a sample with a thickness of 3 mm. The refractive index of the sample was measured by a refractometer (Atago M4) and the hardness thereof was measured by a sclerometer (SH-B) (product of Shore D Inc.). Then, the sample was measured by a spectrometer at a wavelength range of 380~780 nm to obtain a yellow index (YI). The above measurement results are listed in Table 1.

EXAMPLE 2

The encapsulant composition of Example 2 is shown in the table below:

| composition | amount (g) | annotation |
|---|---|---|
| EPON-830 | 100 | average equivalent weight of bi-functional epoxy resin: 161 g/eq. |
| TBT | 31 | molecular weight of bi-functional thiol curing agent containing aromatic ring: 250.40 g/mole |
| PTT-3MP | 29.79 | molecular weight of aliphatic tetra-functional thiol curing agent: 488.66 g/mole |
| U-cat 5003 | 0.08 | quaternary phosphonium bromide accelerator |

The difference between Example 1 and Example 2 is that the bi-functional epoxy resin of Example 2 is diglycidyl ether of bisphenol F (EPON-830) (product of DIC Inc.) and no anti-oxidant is added in the composition of Example 2. Moreover, the ratio of TBT to PTT-3MP of Example 2 is different from that of Example 1, wherein the weight percentage of TBT is increased and the weight percentage of PTT-3MP is reduced.

The epoxy resin (EPON-830), the curing agents (TBT and PTT-3MP) and the catalyst (U-cat 5003) were mixed in a reactor and stirred at 60° C. for reaction for 75 minutes to complete an encapsulant material, then the encapsulant material was deaerated in vacuum for 20 minutes. Next, the encapsulant material was poured into a mold, heated in an oven at 80° C. for one hour and at 160° C. for two hours to be completely cured.

Then, a sample formed from the encapsulant composition of Example 2 was obtained. The sample of Example 2 was measured by the same way as Example 1. The measurement results of Example 2 are listed in Table 1.

EXAMPLE 3

The encapsulant composition of Example 3 is shown in the table below:

| composition | amount (g) | annotation |
|---|---|---|
| EPON-830 | 100 | average equivalent weight of bi-functional epoxy resin: 161 g/eq. |
| Biphenyl dithiol | 28.44 | molecular weight of bi-functional thiol curing agent containing aromatic ring: 458 g/mole |
| PTT-3MP | 60.62 | molecular weight of aliphatic tetra-functional thiol curing agent: 488.66 g/mole |
| U-cat 5003 | 0.38 | quaternary phosphonium bromide accelerator |

The difference between Example 3 and Example 2 is that the bi-functional thiol curing agent containing aromatic ring of Example 3 is bi-[2,2'-bis(mercaptomethyl)-1,1-biphenyl methlene sulfide] (biphenyl dithiol) (synthesized by the inventors).

Preparing Example: Synthesis of Biphenyl Dithiol 25 g (0.0733 mole) of 2,2'-bis(bromomethyl)-1,1-biphenyl and 13.5 g (0.1933 mole) of thiourea were placed in a reaction vase, and then 9 g of deionized water was added. The mixture was stirred for 15 minutes and heated to reflux at 100° C. for reaction for two hours to obtain a transparent mixture. Then, 127.5 g of NaOH water solution (11.6 g of NaOH mixed with 115.9 g of deionized water) was added in the transparent mixture to obtain a yellow mixture. The yellow mixture was continuously reacted for two hours and then cooled to room temperature. After cooling, the resulting mixture was subjected to extraction with dry ether and washed with deionized water until the resulting mixture was neutral, and then filtered to obtain an organic layer. The organic layer was dried, decompressed and the solvent was removed. Then, 12.4 g of a yellow liquid of bi-[2,2'-bis(mercaptomethyl)-1,1-biphenyl methlene sulfide] (biphenyl dithiol) ($C_{28}H_{26}S_3$, molecular weight=458 g/mol) was obtained. The product was measured by a Fourier Transform Infrared spectrometer (FT-IR) to obtain a —SH absorbing peak of 2557 cm$^{-1}$, and measured by a Mass Spectrometer (MS) to obtain a M+1 molecular ion peak of 459.

The curing agents (biphenyl dithiol and PTT-3MP) and the catalyst (U-cat 5003) were mixed in a reactor and stirred at 60° C. for 30 minutes until the catalyst was dissolved. Then, the epoxy resin (EPON-830) was added to the mixture and stirred at room temperature to complete an encapsulant material. Next, the encapsulant material was deaerated in vacuum for 20 minutes and poured into a mold, heated in an oven at 80° C. for one hour and at 160° C. for two hours to be completely cured.

Then, a sample formed from the encapsulant composition of Example 3 was obtained. The sample of Example 3 was measured by the same way as Example 1. The measurement results of Example 3 are listed in Table 1.

EXAMPLE 4

The encapsulant composition of Example 4 is shown in the table below:

| composition | amount (g) | annotation |
| --- | --- | --- |
| EPON-830 | 100 | average equivalent weight of bi-functional epoxy resin: 161 g/eq. |
| Biphenyl dithiol | 56.89 | molecular weight of bi-functional thiol curing agent containing aromatic ring: 458 g/mole |
| PTT-3MP | 45.46 | molecular weight of aliphatic tetra-functional thiol curing agent: 488.66 g/mole |
| U-cat 5003 | 0.40 | quaternary phosphonium bromide accelerator |

The components of the encapsulant composition and the fabrication method of Example 4 is the same as Example 3. The differences between Example 4 and Example 3 are the amounts of bi-functional thiol curing agent containing aromatic ring (biphenyl dithiol) and aliphatic tetra-functional thiol curing agent (PTT-3MP).

A sample formed from the encapsulant composition of Example 4 was measured by the same way as Example 1, and the measurement results are listed in Table 1.

EXAMPLE 5

The encapsulant composition of Example 5 is shown in the table below:

| composition | amount (g) | annotation |
| --- | --- | --- |
| EPON-830 | 100 | average equivalent weight of bi-functional epoxy resin: 161 g/eq. |
| Biphenyl dithiol | 85.34 | molecular weight of bi-functional thiol curing agent containing aromatic ring: 458 g/mole |
| PTT-3MP | 30.31 | molecular weight of aliphatic tetra-functional thiol curing agent: 488.66 g/mole |
| U-cat 5003 | 0.40 | quaternary phosphonium bromide accelerator |

The components of the encapsulant composition and the fabrication method of Example 5 is the same as Examples 3 and 4. The differences between Example 5 and Examples 3, 4 are the amounts of bi-functional thiol curing agent containing aromatic ring (biphenyl dithiol) and aliphatic tetra-functional thiol curing agent (PTT-3MP).

A sample formed from the encapsulant composition of Example 5 was measured by the same way as Example 1, and the measurement results are listed in Table 1.

COMPARATIVE EXAMPLE 1

The encapsulant composition of Comparative Example 1 is shown in the table below:

| composition | amount (g) | annotation |
| --- | --- | --- |
| EPON-828 | 100 | average equivalent weight of bi-functional epoxy resin: 190 g/eq. |
| MHHPA | 88.42 | molecular weight of anhydride curing agent: 168 g/mole |
| U-cat 5003 | 0.5 | quaternary phosphonium bromide accelerator |

The fabrication method of Comparative Example 1 is the same as Example 2. The differences between Comparative Example 1 and Example 2 are that the curing agent of methylhexahydrophtalic anhydride (MHHPA) (product of LONZA Co.) and the epoxy resin of EPON-828 were used in Comparative Example 1, and the mixture of Comparative Example 1 was stirred at room temperature.

A sample formed from the encapsulant composition of Comparative Example 1 was measured by the same way as Example 1, and the measurement results are listed in Table 1.

COMPARATIVE EXAMPLE 2

The encapsulant composition of Comparative Example 2 is shown in the table below:

| composition | amount (g) | annotation |
| --- | --- | --- |
| EPON-828 | 100 | average equivalent weight of bi-functional epoxy resin: 190 g/eq. |
| PTT-3MP | 64.25 | molecular weight of aliphatic tetra-functional thiol curing agent: 488.66 g/mole |
| U-cat 5003 | 0.325 | quaternary phosphonium bromide accelerator |

The fabrication method of Comparative Example 2 is the same as Example 2. The differences between Comparative Example 2 and Example 2 are that the Comparative Example 2 only used aliphatic tetra-functional thiol curing agent (PTT-3MP) as a curing agent and the epoxy resin was EPON-828. The mixture of Comparative Example 2 was stirred at room temperature.

A sample formed from the encapsulant composition of Comparative Example 2 was measured by the same way as Example 1, and the measurement results are listed in Table 1.

COMPARATIVE EXAMPLE 3

The encapsulant composition of Comparative Example 3 is shown in the table below:

| composition | amount (g) | annotation |
|---|---|---|
| 4221EL | 100 | average equivalent weight of bi-functional epoxy resin: 137 g/eq. |
| PTT-3MP | 89.1 | molecular weight of aliphatic tetra-functional thiol curing agent: 488.66 g/mole |
| U-cat 5003 | 0.378 | quaternary phosphonium bromide accelerator |

The fabrication method of Comparative Example 3 is the same as Example 2. The differences between Comparative Example 3 and Example 2 are that the Comparative Example 3 only used an aliphatic tetra-functional thiol curing agent (PTT-3MP) as a curing agent and the epoxy resin was cycloaliphatic epoxy (4221EL) (product of Dow chemical Inc.). The mixture of Comparative Example 3 was stirred at room temperature.

422EL has a structure as below:

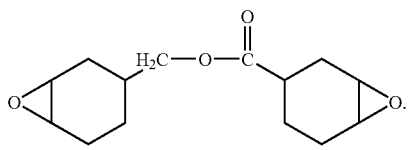

A sample formed from the encapsulant composition of Comparative Example 3 was measured by the same way as Example 1, and the measurement results are listed in Table 1.

COMPARATIVE EXAMPLE 4

The encapsulant composition of Comparative Example 4 is shown in the table below:

| composition | amount (g) | annotation |
|---|---|---|
| MPG | 100 | average equivalent weight of bi-sulfoether epoxy resin: 216 g/eq. |
| MHHPA | 77.78 | molecular weight of anhydride curing agent: 168 g/mole |
| U-cat 5003 | 0.356 | quaternary phosphonium bromide accelerator |

The fabrication method of Comparative Example 4 is the same as Example 2. The differences between Comparative Example 4 and Example 2 are that the curing agent of methylhexahydrophtalic anhydride (MHHPA) and the epoxy resin of bis[4-(2,3-epoxypropylthio)phenyl]sulfide (MPG) (product of Sumitomo Seika Inc.) were used in Comparative Example 4, and the mixture of Comparative Example 4 was stirred at room temperature.

MPG has a structure as below:

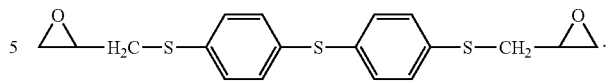

A sample formed from the encapsulant composition of Comparative Example 4 was measured by the same way as Example 1, and the measurement results are listed in Table 1.

COMPARATIVE EXAMPLE 5

The encapsulant composition of Comparative Example 5 is shown in the table below:

| composition | amount (g) | annotation |
|---|---|---|
| MPG | 100 | average equivalent weight of bi-sulfoether epoxy resin: 216 g/eq. |
| TBT | 57.96 | molecular weight of bi-functional thiol curing agent containing aromatic ring: 250.40 g/mole |
| U-cat 5003 | 0.316 | quaternary phosphonium bromide accelerator |

The fabrication method of Comparative Example 5 is the same as Example 2. The differences between Comparative Example 5 and Example 2 are that the Comparative Example 5 only used bi-functional thiol curing agent containing aromatic ring (TBT) as a curing agent and the epoxy resin was bi-sulfoether epoxy resin (MPG). The mixture of Comparative Example 5 was stirred at 100° C. for reaction for 30 minutes.

A sample formed from the encapsulant composition of Comparative Example 5 was measured by the same way as Example 1, and the measurement results are listed in Table 1.

COMPARATIVE EXAMPLE 6

The encapsulant composition of Comparative Example 6 is shown in the table below:

| composition | amount (g) | annotation |
|---|---|---|
| 828-episulfide | 100 | average equivalent weight of bi-episulfide epoxy resin: 412 g/eq. |
| MHHPA | 40.78 | molecular weight of anhydride curing agent: 168 g/mole |
| U-cat 5003 | 0.282 | quaternary phosphonium bromide accelerator |

The fabrication method of Comparative Example 6 is the same as Example 2. The differences between Comparative Example 6 and Example 2 are that the anhydride curing agent of MHHPA and the epoxy resin of bisphenol A episulfide-resin (828-episulfide) (synthesized by the present inventors) were used in Comparative Example 6, and the mixture of Comparative Example 6 was stirred at room temperature.

828-episulfide has a structure as below:

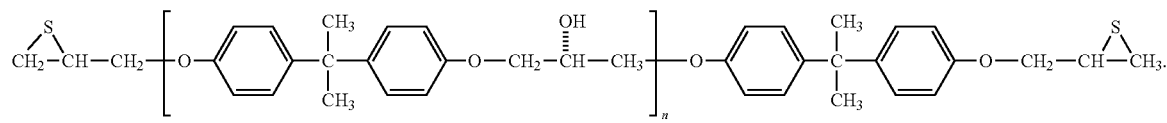

A sample formed from the encapsulant composition of Comparative Example 6 was measured by the same way as Example 1, and the measurement results are listed in Table 1.

COMPARATIVE EXAMPLE 7

The encapsulant composition of Comparative Example 7 is shown in the table below:

| composition | amount (g) | annotation |
|---|---|---|
| MPG | 100 | average equivalent weight of bi-sulfoether epoxy resin: 216 g/eq. |
| PTT-3MP | 56.48 | molecular weight of aliphatic tetra-functional thiol curing agent: 488.66 g/mole |
| U-cat 5003 | 0.313 | quaternary phosphonium bromide accelerator |

The fabrication method of Comparative Example 7 is the same as Example 2. The differences between Comparative Example 7 and Example 2 are that the Comparative Example 7 only used an aliphatic tetra-functional thiol curing agent (PTT-3MP) as a curing agent and the epoxy resin was bi-sulfoether epoxy resin (MPG). The mixture of Comparative Example 7 was stirred at room temperature.

A sample formed from the encapsulant composition of Comparative Example 7 was measured by the same way as Example 1, and the measurement results are listed in Table 1.

COMPARATIVE EXAMPLE 8

The encapsulant composition of Comparative Example 8 is shown in the table below:

| composition | amount (g) | annotation |
|---|---|---|
| EPON-828 | 100 | average equivalent weight of bi-functional epoxy resin: 190 g/eq. |
| TBT | 65.89 | molecular weight of bi-functional thiol curing agent containing aromatic ring: 250.40 g/mole |
| U-cat 5003 | 0.332 | quaternary phosphonium bromide accelerator |

The fabrication method of Comparative Example 8 is the same as Example 2. The differences between Comparative Example 8 and Example 2 are that Comparative Example 8 only used a bi-functional thiol curing agent containing aromatic ring (TBT) as a curing agent and the epoxy resin was EPON-828. The mixture of Comparative Example 8 was stirred at 100° C. for reaction for 30 minutes.

A sample formed from the encapsulant composition of Comparative Example 8 was measured by the same way as Example 1, and the measurement results are listed in Table 1.

COMPARATIVE EXAMPLE 9

The encapsulant composition of Comparative Example 9 is silicone resin (DOW CORNING® SR-7010) (product of Dow chemical. Inc.).

A sample formed from the encapsulant composition of Comparative Example 9 was measured by the same way as Example 1, and the measurement results are listed in Table 1.

TABLE 1

The material characteristics of Examples 1 to 5 and Comparative Examples 1 to 9

| encapsulant composition | refractive index | yellow index | hardness |
|---|---|---|---|
| Example 1 | 1.61 | 2.05 | 83.0 D |
| Example 2 | 1.63 | 3.25 | 77.3 D |
| Example 3 | 1.62 | 3.24 | 85.2 D |
| Example 4 | 1.64 | 3.82 | 81.4 D |
| Example 5 | 1.66 | 4.51 | 78.0 D |
| Comparative Example 1 | 1.53 | 1.21 | 91.7 D |
| Comparative Example 2 | 1.58 | 0.60 | 80.7 D |
| Comparative Example 3 | 1.55 | 0.88 | 84.4 D |
| Comparative Example 4 | 1.60 | 7.24 | — |
| Comparative Example 5 | 1.74 | 38.3 | — |
| Comparative Example 6 | 1.57 | 4.88 | 91.6 D |
| Comparative Example 7 | 1.64 | 7.68 | 42 D |
| Comparative Example 8 | 1.66 | 32.4 | 55 D |
| Comparative Example 9 | 1.51 | — | 67 D |

The requirements for encapsulants of light emitting devices are high refractive index and transparent. Most of the compounds containing high content of sulfide are yellow, therefore the applications thereof are limited. For example, in the Comparative Example 5 and Comparative Example 8, only one kind of curing agent of bi-functional thiol curing agent containing aromatic ring TBT was used to combine with resin. As shown in Table 1, although the refractive indexes of Comparative Example 5 and Comparative Example 8 were increased to 1.74 and 1.66, respectively, the yellow indexes thereof were also increased to 38.3 and 32.4, respectively.

For the requirement of transparency for encapsulants of light emitting devices, a colorless anhydride curing agent was used to combine with the resin containing sulfur. For example, in Comparative Example 4 and Comparative Example 6, bi-sulfoether epoxy resin (MPG) and bisphenol A episulfide-resin (828-episulfide) were used, respectively. Although the yellow indexes of Comparative Example 4 and Comparative Example 6 were reduced to 7.24 and 4.88, respectively, the refractive indexes thereof were respectively only 1.60 and 1.57. The enhancements of refractive indexes in Comparative Example 4 and Comparative Example 6 were limited.

In Comparative Example 2 and Comparative Example 3, epoxy resin without sulfur such as 4221EL or EPON-828 was used to combine with colorless curing agent containing sulfur such as PTT-3MP. The yellow indexes thereof were reduced to about 1, but the refractive indexes thereof were not more than 1.58.

Therefore, the encapsulant composition of the invention utilizes a tetra-functional thiol curing agent and bi-functional thiol curing agent containing aromatic ring to combine with liquid bi-functional epoxy resin. The encapsulant composition of the invention can achieve high refractive index and low yellow index. As shown in Table 1, the refractive indexes of Example 1 and Example 2 achieved 1.61 and 1.63, respectively, and the yellow indexes thereof were respectively only 2.05 and 3.25.

As shown in Table 1, Examples 3, 4 and 5 used biphenyl dithiol synthesized by the inventors as bi-functional thiol curing agent containing aromatic ring of the encapsulant composition, such that the refractive indexes thereof achieved 1.62, 1.64, and 1.66, respectively, and the yellow indexes thereof were respectively only 3.24, 3.82 and 4.51.

Moreover, when comparing the hardness of the Examples and Comparative Examples, the hardness of the encapsulant of the invention was between 91.7 D of the commercial resin of Comparative Example 1 and 67 D of the silicone resin of Comparative Example 9. The hardness of the encapsulant of the invention was about 75 D to 85 D, which can overcome poor thermal stress dispersion of the commercial epoxy resin encapsulant. Moreover, the silicone resin is very soft and it needs complex packaging structures to well protect the LED device. The encapsulant of the invention can overcome the disadvantage of silicone resin of the protection issue. Therefore, the encapsulant composition of the invention is suitable for high powered LEDs.

Meanwhile, the encapsulant materials of Examples 1, 2 and Comparative Examples 1, 2 were applied to an LED and total light extraction efficiencies of red light and blue light LEDs were measured by a 250 mm lumen integrating sphere. The light extraction efficiencies of red light LEDs of Examples 1, 2 and Comparative Example 2 were compared with Comparative Example 1, and the results are shown in Table 2 below:

TABLE 2

The light extraction efficiencies of the encapsulant materials of Examples 1, 2 and Comparative Examples 1, 2

| encapsulant composition | refractive index | light extraction efficiency (W) of red light LED | light extraction efficiency (W) of blue light LED | enhanced ratio (%) of light extraction efficiency for red light LED | enhanced ratio (%) of light extraction efficiency for blue light LED |
|---|---|---|---|---|---|
| Example 1 | 1.61 | 0.00816 | — | 7.8% | — |
| Example 2 | 1.63 | 0.00863 | 0.01098 | 14% | 13% |
| Comparative Example 1 | 1.53 | 0.00757 | 0.00970 | — | — |
| Comparative Example 2 | 1.58 | 0.00790 | — | 4.4% | — |

As shown in Table 2, the encapsulant composition of the invention with high refractive index enhanced the light extraction efficiency of LEDs. The encapsulant composition of Example 1 had a refractive index of 1.61 and the conventional encapsulant composition of Comparative Example 1 had a refractive index of 1.53, showing that the encapsulant composition of Example 1 enhanced the red light extraction efficiency of a lamp-type LED by 7.8%. Meanwhile, the encapsulant composition of Example 2 having refractive index of 1.63 enhanced the red light extraction efficiency of a lamp-type LED by 14%. In Comparative Example 2, the curing agent was a single kind of thiol curing agent, therefore the refractive index and the light extraction efficiency of the encapsulant of Comparative Example 2 was not enhanced efficiently. The encapsulant composition of the invention using curing agents different from that of the conventional encapsulant composition, showed that refractive index and light extraction efficiency thereof are enhanced substantially. Moreover, the encapsulant composition of Example 2 enhanced blue light extraction efficiency by 13%.

In addition, the encapsulant materials of Example 1 and Comparative Examples 1 and 2 were stored at 110° C. for 96~720 hours for testing, and then measured by a spectrometer at wavelength range of 380~780 nm to obtain the difference of yellow index ($\Delta$ YI) between the initial yellow index and the yellow index after storing at high temperature. The measurement results are shown in Table 3 below:

TABLE 3

The thermal storing stability of the encapsulant materials of Example 1 and Comparative Examples 1 and 2

| | the difference of yellow index ($\Delta$ YI) under storing at 110° C. | | | |
|---|---|---|---|---|
| encapsulant composition | $\Delta$ Y.I. after 96 hours | $\Delta$ Y.I. after 240 hours | $\Delta$ Y.I. after 480 hours | $\Delta$ Y.I. after 720 hours |
| Example 1 | 0.52 | 0.8 | 1.47 | 2.31 |
| Comparative Example 1 | 0.53 | 1.64 | 2.66 | — |
| Comparative Example 2 | 1.90 | 5.19 | — | — |

As shown in Table 3, when compared with the commercial encapsulant materials, thermal yellowing resistant property of the encapsulant material of the invention was enhanced by the addition of the anti-oxidants to the encapsulant composition. The encapsulant of the invention was stored at 110° C. for more than 500 hours and almost did not show yellowing. The difference of yellow index ($\Delta$ YI) of the encapsulant materials of the invention was less than 2 such that the material is suitable for the encapsulant of LEDs.

Moreover, recently, driven by environmental consciousness, portions of the LED packaging process have been performed by lead-free soldering technologies. Therefore, appropriate encapsulant materials must have heat-resistant properties to resist high temperatures of lead-free soldering processes. The encapsulant composition of Example 1 of the invention was tested under the temperature of a lead-free soldering process of 260° C. to obtain the difference of yellow index ($\Delta$ YI). The measured results are shown in Table 4 below:

TABLE 4

The difference of yellow index ($\Delta$ YI) of the encapsulant material of Example 1 under soldering test

| | The difference of yellow index ($\Delta$ YI) under soldering test of 260° C. | |
|---|---|---|
| encapsulant composition | $\Delta$ Y.I. after 30 seconds | $\Delta$ Y.I. after 90 seconds |
| Example 1 | 0.07 | −0.01 |

As shown in Table 4, the difference of yellow index ($\Delta$ YI) of the encapsulant material of Example 1 was −0.01 under a soldering test of 260° C. for 90 seconds. The negative value for the difference of yellow index (ΔYI) was produced from measurement variation of the instrument. The difference of yellow index (ΔYI) of the encapsulant material of Example 1 can be taken as zero. Therefore, the encapsulant of the invention having high refractive index can be used in a lead-free soldering process.

Additional results show that the encapsulant of the invention can withstand long operating time, for example, more than two hours of operation at 60° C., with the viscosity thereof controlled at 1000~10000 cps. Therefore, showing that the encapsulant of the invention can be used in the current LED packaging process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An encapsulant composition for a light-emitting diode, comprising:
    (a) about 100 parts by weight of at least one liquid bi-functional epoxy resin containing about 40~50 weight % of aromatic ring;
    (b) about 55~120 parts by weight of a curing agent comprising at least one bi-functional thiol curing agent containing aromatic ring and at least one aliphatic tetra-functional thiol curing agent, wherein the curing agent contains about 10~50 weight % of aromatic ring and about 20~35 weight % of sulfur and the aliphatic tetra-functional thiol curing agent comprises a pentaerythritol tetrakis (3-mercaptopropionate) (PTT-3MP); and
    (c) about 0.05~0.5 parts by weight of a catalyst.

2. The encapsulant composition as claimed in claim 1, wherein the liquid bi-functional epoxy resin comprises bisphenol A epoxy resin or a bisphenol F epoxy resin.

3. The encapsulant composition as claimed in claim 1, wherein the bi-functional thiol curing agent containing aromatic ring comprises 4,4'-thiobisbenzenethiol (TBT) or bi-(2,2'-bis(mercaptomethyl)-1,1-biphenyl methlene sulfide).

4. The encapsulant composition as claimed in claim 1, wherein the catalyst comprises a quaternary phosphonium bromide accelerator.

5. The encapsulant composition as claimed in claim 1, further comprising about 0.25~1 parts by weight of an anti-oxidant.

6. The encapsulant composition as claimed in claim 5, wherein the anti-oxidant comprises a hindered phenol compound or an organic phosphite compound.

7. The encapsulant composition as claimed in claim 1, wherein the bi-functional thiol curing agent containing aromatic ring to the aliphatic tetra-functional thiol curing agent has a weight ratio of about 1:4 to 3:1.

8. The encapsulant composition as claimed in claim 1, wherein a cured form of the encapsulant composition has a refractive index of about 1.6 to 1.7.

9. The encapsulant composition as claimed in claim 1, wherein a cured form of the encapsulant composition has a hardness of about 75D to 85D.

* * * * *